United States Patent Office 2,974,736
Patented Mar. 14, 1961

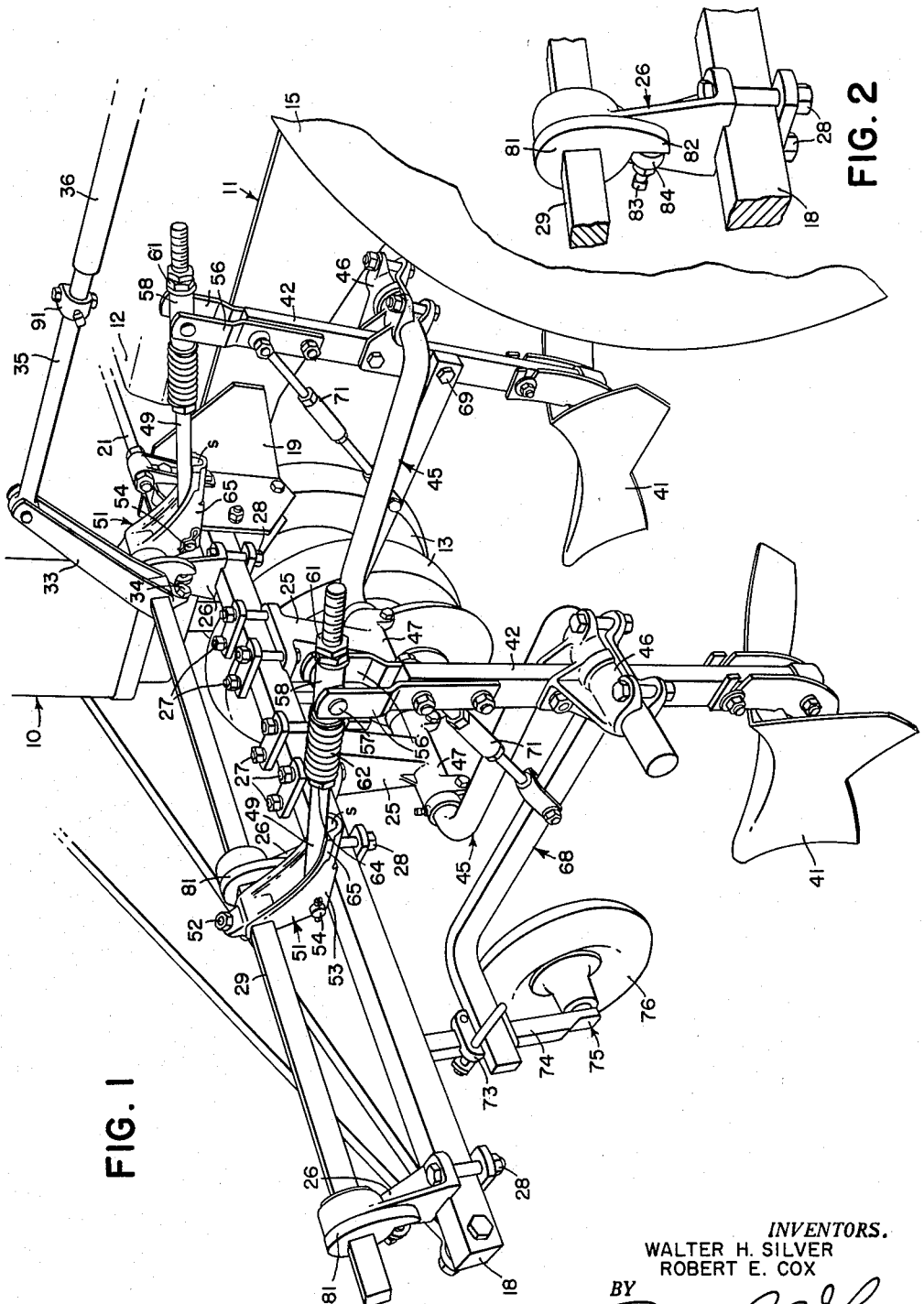

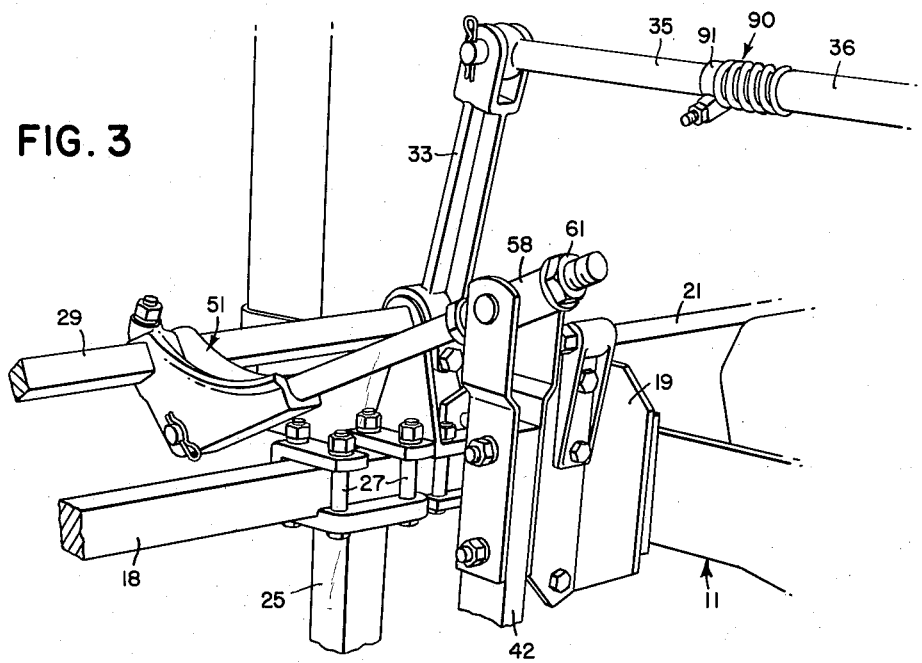
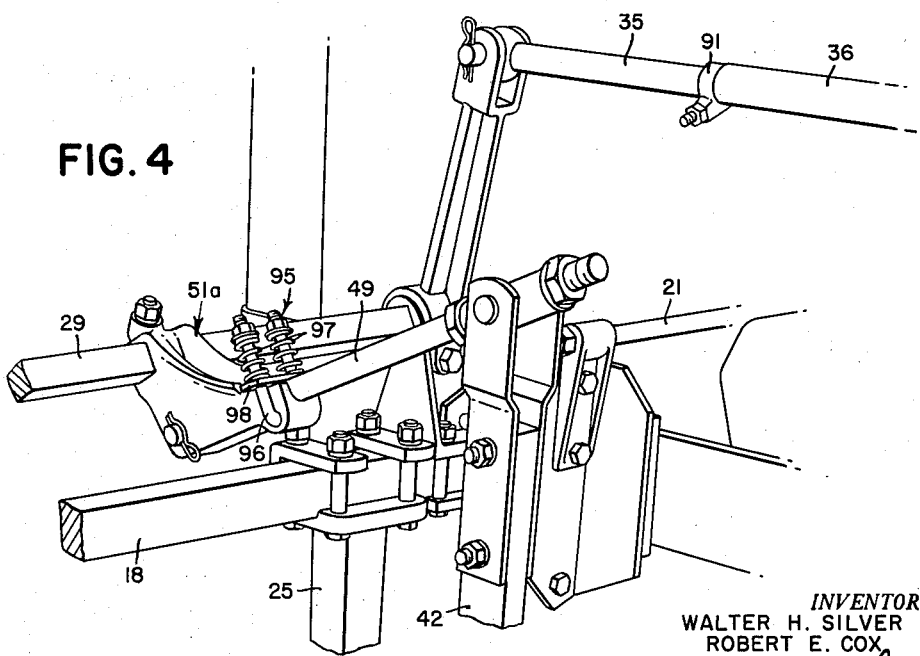

2,974,736

FRONT MOUNTED BEDDER

Walter H. Silver and Robert E. Cox, Moline, Ill., assignors, by mesne assignments, to Deere & Company, a corporation of Delaware Filed Sept. 11, 1956, Ser. No. 609,197

3 Claims. (Cl. 172—298)

The present invention relates generally to agricultural implements and more particularly to tractor mounted implements of the ground working type.

The object and general nature of the present invention is the provision of a ground working implement, such as a front end bedder, that comprises a mobile support in the form of a farm tractor and suitable connections whereby the ground working tools are capable of generally vertical floating movement relative to the tractor with forwardly disposed ground engaging gauge means acting to prevent the ground working tools from going too deep and adversely affecting steering of the tractor if, for example, excessive soil resistance should be encountered by the tool or tools at one side as compared with that encountered by the tool or tools at the other side.

A further feature of this invention is the provision of means in the nature of resilient or yielding mechanism acting in cooperation with forwardly disposed ground engaging gauge means to cause the tool or tools to be shifted to a position of slightly decreased depth if additional or excessive soil pressure should be encountered.

Still further, a feature of this invention resides in the provision of means for relieving excessive soil pressure and, in addition, means accommodating a relatively free floating movement of the tools so as to take care of variations in the ground level without interfering with the protection against excessive soil pressure acting against the tool or tools.

These and other objects and advantages of the present invention will be apparent to those skilled in the art after a consideration of the following detailed description, taken in conjunction with the accompanying drawings, in which:

Fig. 1 is a fragmentary perspective view of a portion of the front mounted bedder in which the principles of the present invention have been incorporated.

Fig. 2 is a fragmentary perspective view of a portion of the rockshaft stop means employed in the construction shown in Fig. 1.

Fig. 3 is a view similar to Fig. 1, showing a modified arrangement.

Fig. 4 is a view similar to Fig. 3, showing a further modified form of this invention.

Referring first to Fig. 1, the reference numeral 10 indicates a farm tractor of more or less conventional construction, the tractor including suitable frame means 11 which supports the tractor engine 12 and is carried on a pair of closely spaced front wheels 13 and a pair of relatively widely spaced apart rear wheels 15. The front portion of the tractor is provided with right and left hand laterally outwardly or transversely extending draft bars 18, only the left one being indicated in Fig. 1. Each draft bar 18 is connected at its inner end to an attaching bracket 19 that bolts or is otherwise rigidly secured to the frame 11 of the tractor. The two attaching bracket means 19 may be interconnected, as indicated at 21, if desired. It will be understood that the right hand draft bar and associated parts are substantially identical with the left hand bar 18 and associated parts shown in Fig. 1.

Each draft bar 18 carries bracket means in the form of a pair of depending brackets 25 and a plurality of upwardly extending brackets 26, each being rigidly secured to the draft bar 18 by bolt means 27 and 28, respectively. A rockshaft 29 is supported for rocking movement on the upwardly extending bracket means 26, and it will be understood that there is a rockshaft 29 at each side of the tractor 10, each supported for rocking movement on the associated draft bar 18. At its laterally inner end, each transverse rockshaft 29 carries an arm 33, rigidly secured thereto by any suitable means, such as a clamping bolt 34, and the upper end of each actuating arm 33 is connected to a push rod 35 which, with a push pipe member 36, constitutes actuating means deriving energy from the tractor power lift unit for rocking the rockshaft 29 in a direction to raise, as into a transport position, tool means associated therewith. The tractor power lift unit is not shown in detail, but it will be understood that the same includes a transverse power lift shaft at the rear of the tractor, each end of the power lift shaft carrying arms to which the rear ends of the two push pipes 36 are pivotally connected. Mechanism of this type is well known, so far as the principles of the present invention are concerned, and for a further disclosure of such mechanism, reference may be had to Jirsa et al. 2,532,552, issued December 5, 1950. It will be understood that the tractor power lift unit is connected to swing both of the rockshafts 29 into various positions for the purpose of raising and lowering associated tool means and also for the purpose of holding the tools in or disposing the tools in different positions for determining or controlling the depth of operation thereof.

To illustrate the principles of the present invention, the tool means has been shown as a pair of furrow forming double moldboard type bottoms 41, there being, for example, two at each side of the tractor. Each bottom 41 is fastened in any suitable way to the lower end of a generally vertically extending standard 42, and each standard 42 is connected with the associated draft bar 18 for generally vertical movement with respect thereto. To this end, a lower link member 45 is pivotally connected, as at 46, with the associated standard 42 above the bottom 41, each lower link 45 extending generally forwardly and pivotally connected, as at 47, with the lower portion of the associated bracket 25. Shifting the brackets 25 along the draft bar 18 and/or changing the positions of the lower links 45 provide for disposing the bottom 41 to vary the spacing between the furrows formed thereby.

The upper end of each of the standards 42 is connected by an upper link 49 with a bell crank-like arm 51 with the rockshaft 29, there being one of the arms 51 for each of the standards 42. Each arm 51 is rigidly fastened, as at 52, to the rockshaft 29 and each includes a depending portion or lower portion 53 to which the front end of the associated upper link 49 is pivotally connected, as at 54. The rockshaft 29, together with its rigidly fastened arms 51, constitutes a member rockably mounted on the associated draft bar 18. The upper end of each standard 42 carries a pair of laterally spaced apart strap members 56, which form a bifurcated portion at the upper end of the standard 42, and the strap members 56 are apertured to receive trunnions 57 by which a sleeve member 58 is pivoted to the upper end of the associated standard 42. The rear end of the upper link 49 is slidable within the sleeve section 58, the rear end of each link 49 being screw threaded and receiving a pair of lock nuts 61 or other suitable stop means. The nuts 61 serve as means to adjust the suction or suck of the associated lister bottom 41. Resilient means in the form of a coil spring 62 is disposed about each upper link 49 and lies ahead of the front end of the sleeve section 58, being confined thereagainst by a second pair of lock nuts 64 or equivalent means. Each bell crank member 51 carries a rearwardly extending portion 65 that underlies the forward portion of the associated upper link 49, but normally there is a space, indicated at *s* in Fig. 1, between the rearwardly extending portion 65 and the associated link 49, whereby within the limits as defined by the space *s*, each bottom 41 and associated standard 42 may swing or shift vertically relative to the associated draft bar 18, rockshaft 29, and bell crank member or arm 51.

Secured to each standard 42 at a point above the associated bottom 41 is a gauge wheel supporting bar 68, each bar 68 preferably being rigidly fixed to the associated standard 42 by fastening means 69 and reinforced by an adjustable diagonal brace 71 of any suitable construction. The front end of each bar 68 is turned laterally and receives associated clamp means 73 by which the shank 74 of a gauge wheel axle member 75 is rigidly connected therewith. A gauge wheel 76 is carried on each axle member 75, and the vertical and/or lateral position of the gauge wheel 76 may be varied, as desired by loosening the clamp 73 and shifting the shank 74 laterally or vertically, or both, relative to the bar 68.

Adjacent each of the brackets 26, each rockshaft 29 carries a motion limiting means in the form of an arm or cam 81 apertured to non-rotatably receive the rockshaft 29, which is preferably square in cross section. Each arm or cam member 81 includes an extension 82 which cooperates with an adjustable abutment that preferably takes the form of a set screw 83 disposed in adjustable relation with an associated boss or projection 84 formed on the adjacent bracket 26. The structure just described forms a positive stop, which may be adjusted, that limits the rotation of the rockshafts 29 in the brackets 26 in one direction, which is the direction that accommodates lowering movement of the associated tool means 41. By the use of such positive stop means, which determines the maximum depth at which the bottoms 41 may operate, the power lift unit of the tractor and the associated push pipe means are relieved of this function, although, as will be explained later, the power lift mechanism and associated parts may be utilized for this purpose, if desired.

The operation of the form of the invention shown in Figs. 1 and 2 is substantially as follows.

Assuming that, as illustrated in Fig. 1, the tools 41 are in operating or ground entering position, the resistance of the soil acts against the lower ends of the standards 42, the reaction thereof being transmitted through the springs 52 and upper links 49 to the arms 51 and the rockshaft 29. Movement of the latter under the reactions just described is limited by the positive stop means 81—84. If the outfit in normal operation traverses uneven ground, the furrow openers 41 may raise or fall, if necessary, by virtue of the permissive up and down swinging of the links 45 and 49 relative to the associated draft bar 18. If, moreover, at any depth of operation, the soil pressure acting against the tools 41 at the lower end of the standards 42 becomes excessive the springs 62 yield, permitting the standards 42 to pivot generally about their connection with the rear ends of the lower links 45. Such pivoting movement acts to cause the gauge wheels 76 to press downwardly on the surface of the ground with increased force, with the result that, since the gauge wheels 76 are located well in front of the bottoms 41, the bottoms 41 are lifted slightly, moving generally about the gauge wheel 76 as a fulcrum. The upward swinging of the upper links 49 away from the rear extensions 65 accommodate this movement, and as a result, the excessive soil pressure is relieved and thus, if the soil pressure against the tools at one side of the tractor is in excess of that at the other side, such excessive pressure, being relieved, does not materially affect the steering of the tractor. Also, the press wheels 76, being located in front of the tools 41, act also to correct any tendency for the tools 41 to run too deep if, for example, soil conditions are such that the tools 41 might tend to move to a greater depth of operation than desired.

The springs 62 on the links 49, which resist forward tilting of the standards 42 under conditions of excessive soil pressure on the links 49, are not the only means by which excessive soil pressure may be resisted. For example, referring now to Fig. 3, the springs 62 may be entirely omitted from the upper links 49 and, in lieu thereof, a single spring 90 disposed between the front end of the push pipe 36 and a set screw collar 91, or suitable abutment means, on the push rod 35. In this form of the invention the positive stop means 81—84 are also eliminated. Thus, in the form of the invention shown in Fig. 3, excessive soil pressure acting against the bottoms 41 and transmitted through the upper links 49 to the arm members 51 is imposed directly on the rockshaft 29, and such reaction is transmitted by the lifting arm 33 to the spring 90, yielding of which accommodates the aforesaid tilting of the standards 42. As described above, such forward tilting of the standards 42 causes increased pressure to be applied by the gauge wheel 76 against the ground, and the reaction of that pressure results in lifting of the bottoms 41 which relieves the condition of excessive soil pressure.

A further form of the present invention is shown in Fig. 4. In this form of the invention the spring 90 is eliminated but, like the form of the invention shown in Fig. 3, the depth of operation is determined by the position of the push pipe 36, the latter being disposed in proper position, as desired, by proper operation of the power lift unit. In the form of the invention shown in Fig. 4 upward movement of the upper links 49 away from the associated portions of the arm 51 is limited by resilient means 95 that includes a U-bolt 96, the lower portion of which is pivotally connected with the rear portion of the arm 51a, and a pair of springs 97 disposed about the leg portions of the U-bolt 96, the spring 97 acting through a crossbar 98 against the associated upper link 49 to yieldably hold the latter against the rearwardly extending portion of the arm 51. The tension exerted by the springs 97 may be adjusted by lock nuts or the like carried on the upper ends of the U-bolt 96. In this form of the invention the springs 97 hold the tools to their work, yieldably resisting upward displacement thereof, as may occur if the tools should hit a hard spot. The working depth of the tools is determined by the position of the push pipe 36, the set screw collar 91 being adjusted on the push rod 35 so as to serve as a stop limiting the rearward movement of the lift arm 33. In this arrangement there is no tilting of the standards 42 under excessive soil pressure acting against the bottoms 41, and therefore the gauge wheel 76, while limiting the downward movement of the tools relative to the surface of the ground, serves only as a depth determining means, such as an ordinary gauge wheel.

While we have shown and described above the preferred structure in which the principles of the present invention have been incorporated, it is to be understood that our invention is not to be limited to the particular details, shown and described above, but that, in fact, widely different means may be employed in the broader aspects of our invention.

What we claim, therefore, and desire to secure by Letters Patent is:

1. In an agricultural implement, a mobile support, a laterally outwardly extending draft bar carried by said mobile support, a generally vertical standard, ground-working tool means connected with the lower end of said standard, upper and lower link means connected at their rear ends with said standard, means connecting the forward end of the lower link means with said draft bar, a member rockably mounted on said draft bar for movement about a transverse axis and having a depending portion, means pivotally connecting the forward end of the upper link means with said depending portion, means limiting the rocking movement of said rockably mounted member in a direction corresponding to the forward movement of said upper link, means adjustably disposing said motion limiting means in different positions of adjustment, to thereby vary the forwardly tilted position of said standard, the fore-and-aft extending part of said depending arm being normally spaced from said upper link in at least certain of said positions, and raising means connected with said rockably mounted member to rock the latter in the generally opposite direction and acting first to tilt the upper end of said standard rearwardly and then to raise said upper link so as to raise said standard.

2. In an agricultural implement, a mobile support, a draft bar rigidly carried by said support, a transverse rockshaft carried by said support for rocking movement relative to said draft bar, a generally vertical standard, ground engaging tool means fixed to the lower end of said standard whereby during forward travel soil pressure against said tool means acts to shift the lower portion of said standard rearwardly, upper and lower link means, means pivotally connecting the front and rear ends of said lower link means with said draft bar and the intermediate portion of said standard, respectively, means pivotally connecting the front and rear ends of said upper link means with the upper end portion of said standard and said rockshaft, respectively, said last mentioned connecting means including spring biased yielding means accommodating forward displacement of the upper portion of said standard, an arm rigid with said standard and extending forwardly thereof, and a ground engaging gauge wheel disposed at the forward portion of said arm, yielding of said spring biased means providing for forward movement of the upper portion of said tool means relative to said lower link means and the resulting tilting of said tool means acting through said rigid arm and gauge means to raise said tool means.

3. In an agricultural implement, a mobile support, a draft bar rigidly carried by said support, a transverse rockshaft carried by said support, said transverse rockshaft being carried for rocking movement relative to said draft bar, ground engaging tool means, upper and lower link means, means pivotally connecting the front and rear ends of said lower link means with said draft bar and said tool means, respectively, means pivotally connecting the front and rear ends of said upper link means with said tool means and said rockshaft, respectively, said last mentioned connecting means including a sleeve section through which said upper link means is slidable, one of said sleeve and link means being shiftable forward relative to the other, spring means connected between said sleeve and link means to limit said relative forward movement, and suction-adjusting means connected to act between said upper link means and the tool means, an arm rigid with said tool means and extending forwardly thereof, and a ground engaging gauge wheel disposed at the forward portion of said arm, yielding of said spring means providing for forward movement of the upper portion of said tool means relative to said lower link means and the resulting tilting of said tool means acting through said rigid arm and gauge means to raise said tool means.

References Cited in the file of this patent

UNITED STATES PATENTS

| | | |
|---|---|---|
| 1,694,252 | Doepke | Dec. 4, 1928 |
| 1,746,606 | Ray | Feb. 11, 1930 |
| 1,962,349 | Johnson | June 12, 1934 |
| 2,232,523 | Gray | Feb. 18, 1941 |
| 2,332,616 | Tuft | Oct. 26, 1943 |
| 2,793,577 | Paige | May 28, 1957 |